United States Patent
Abbott

(10) Patent No.: US 10,362,086 B2
(45) Date of Patent: Jul. 23, 2019

(54) METHOD AND SYSTEM FOR AUTOMATING SUBMISSION OF ISSUE REPORTS

(71) Applicant: Medidata Solutions, Inc., New York, NY (US)

(72) Inventor: Charles Abbott, Ichikawa (JP)

(73) Assignee: Medidata Solutions, Inc., New York, NY (US)

( * ) Notice: Subject to any disclaimer, the term of this patent is extended or adjusted under 35 U.S.C. 154(b) by 0 days.

(21) Appl. No.: 14/568,769

(22) Filed: Dec. 12, 2014

(65) Prior Publication Data

US 2016/0173486 A1    Jun. 16, 2016

(51) Int. Cl.
*H04L 29/08* (2006.01)
*G06F 21/62* (2013.01)

(52) U.S. Cl.
CPC .......... *H04L 67/02* (2013.01); *G06F 21/6245* (2013.01)

(58) Field of Classification Search
CPC . H04L 12/2602; H04L 41/0866; H04L 63/20; H04L 63/1408; G06F 11/1484
USPC .......................................................... 726/22
See application file for complete search history.

(56) References Cited

U.S. PATENT DOCUMENTS

| | | | | |
|---|---|---|---|---|
| 2002/0078382 A1* | 6/2002 | Sheikh | ................ | H04L 12/2602 726/22 |
| 2008/0126110 A1* | 5/2008 | Haeberle | ............. | G06F 11/2257 717/168 |
| 2009/0164853 A1* | 6/2009 | Gokhale | ............. | G06F 11/0709 714/57 |
| 2012/0185544 A1 | 7/2012 | Chang et al. | | |
| 2012/0246139 A1 | 9/2012 | Rao | | |
| 2013/0111016 A1 | 5/2013 | Wilson et al. | | |
| 2013/0204785 A1* | 8/2013 | Monk | .................... | G06Q 20/32 705/44 |

(Continued)

FOREIGN PATENT DOCUMENTS

KR    10-2013-0053803 A    5/2013

OTHER PUBLICATIONS

The International Search Report and Written Opinion of the International Searching Authority, PCT/US2014/071943, dated Aug. 31, 2015.

*Primary Examiner* — Ashokkumar B Patel
*Assistant Examiner* — William B Jones
(74) *Attorney, Agent, or Firm* — Steptoe & Johnson LLP; Robert Greenfeld

(57) ABSTRACT

A method for automating the submission of issue reports includes automatically capturing information and images related to a software user, receiving a request from the user involving an issue experienced by the user, evaluating the request and the user information and images, generating a unique identifier that matches a response received by the user when making the request to associated server log information, generating an issue report based on the user information and images, server log information, and the generated unique identifier, and generating a ticket associated with the issue report that may be communicated to an external system. The user request information and images, server log information, and unique identifier may be stored in a database or data repository. The user information and images and server log information may be automatically encrypted. A system for automating the submission of issue reports is also described.

20 Claims, 7 Drawing Sheets

(56) References Cited

U.S. PATENT DOCUMENTS

2014/0195864 A1* 7/2014 Dempski ............ H04L 41/5074
                                                                 714/57
2014/0325487 A1   10/2014 Maczuba

* cited by examiner

Studies

| | | | → View All Users | ↓ Export List | +Create Study |

| All (363) | ☰ Active (353) | 🔒 Locked (5) | ⊟ Inactive (5) | Search by All ▼ | Find a Study | 🔍 |
|---|---|---|---|---|
| Protocol ID ▼ | Name | Indication | Phase | Test Study |
| ☰ 0000-PID-test-MD-01 | 0000-PID-test-MD | Aftercare... | Phase I Trial | |
| ☰ 00000 Reveal | Whole Lot of Sites xyz | Thrombosis... | Phase IIa Trial | ✓ |
| 🔒 000001 JAS | 000001 JAS | Atrophic... | Phase I Trial | |
| 🔒 0001_1234_9999... | 0001_1234_9999... | Thrombosis and... | Phase I Trial | ✓ |
| ☰ 0002_test_MI | 0002_test_MI | Depression... | Phase I Trial | |
| ☰ 0003_test_MI | 0003_test_MI | Anti-inflammatory... | Phase I Trial | |
| ☰ 0004_test_MI | ICE CREAM | Acute Pulmonary... | Phase I Trial | |
| ☰ 0005_JAS_0117 | 2013-Jan-17 0005-JAS | Neoplasm... | Phase I Trial | ✓ |
| ☰ 0005_JAS_0117-dup | 2013-Jan-17 0005-JAS-dup | Thrombosis... | Phase IIa Trial | |

Studies

| | | | → View All Users | → Export List | +Create Study |
|---|---|---|---|---|---|
| All (363) | ☰ Active (353) | 🔒 Locked (5) | 🗑 Inactive (5) | Search by All ▼ | 🔍 Find a Study |

| Protocol ID ▼ | Name | Indication | Phase |
|---|---|---|---|
| ☰ 0000-PID-test-MD-01 | 0000-PID-test-MD | Aftercare... | Phase I |
| ☰ 00000 Reveal | Whole Lot of Sites xyz | Thrombosis... | Phase II |
| 🔒 000001 JAS | 000001 JAS | Atrophic... | Phase I |
| 🔒 0001_1234_9999... | 0001_1234_9999... | Thrombosis and... | Phase I |
| ☰ 0002_test_MI | 0002_test_MI | Depression... | Phase I |
| ☰ 0003_test_MI | 0003_test_MI | Anti-inflammatory...| Phase I |
| ☰ 0004_test_MI | ICE CREAM | Acute Pulmonary... | Phase I |
| ☰ 0005_JAS_0117 | 2013-Jan-17 0005-JAS | Neoplasm... | Phase I |
| ☰ 0005_JAS_0117-dup | 2013-Jan-17 0005-JAS-dup | Thrombosis... | Phase I |

Test Study

Report an Issue

Your Email — 430
[Enter your Email]

What happened? — 440
[                    ]

[Report Issue] — 460

Attached Screenshot — 425
— 450

Ticket # 3841    490

Show all events           Attach file cabbott   1 minute ago (assign)

I got the call the doctor message. Something is broken! ← 445

Last Visited: https://checkmate-sandbox_imed.data.net/apps/66bce25d/site/index
/2ba40-
f57e-4474-9a77-09d2af636b2e7c_selections-comix3Amdsobx3Aconfiguration_type_ro
lesx3A23daf2ce-516e-41fb-
a3b9-e029db107249X2Ccomix3Amdsobx3AstudiesX3Ae44c9610-b86c-42f0-91ca
74c9ac02db72x2Ccomix3Amdsobx3Ccomix3Amdsobx3Astudy_environmentsX3Aca7580a5-d021-420b-
a6b7-abd35dd888fdx2Ccomix3Amdsobx3Astudy_environment_sitesX3a8e72ba40-
f57e-4474-9a77-09d2af636b2eX2Ccomix3AactionX3Aaccess_edc_site&
study_uuid=ca7580a5-d021-420b-a6b7-abd35dd888fd

← 470

Trace IDs: ← 480
77cc40cacd41d76ab06f0bbca1f8bf31
b4d7752582259280adal0a88cf66345
1c75c9e2cf34a6bc9cdfc7e76c685ce1

METHOD AND SYSTEM FOR AUTOMATING SUBMISSION OF ISSUE REPORTS

BACKGROUND

To submit issue reports, software users may utilize external, downloaded software and operating-system-specific screen capturing functionality. When a user experiences an issue, the user may need to manually create the issue experienced to capture relevant screenshots pertaining to the issue. Additionally, in reporting the issue, the user may need to manually provide customer care with pertinent data. To analyze the reported issue, customer care and engineers may also need to retrieve log information from all related back-end systems making up the platform pertaining to the experienced issue.

BRIEF DESCRIPTION OF THE DRAWINGS

FIG. 4A illustrates a web application page that supports automating the submission of issue reports, according to an embodiment of the present invention;

FIG. 4B illustrates a user interface for submitting information related to an issue experienced by a user, according to an embodiment of the present invention; and FIG. 4C illustrates a system-generated ticket associated with an issue report, according to an embodiment of the present invention.

DETAILED DESCRIPTION

Figure 1:
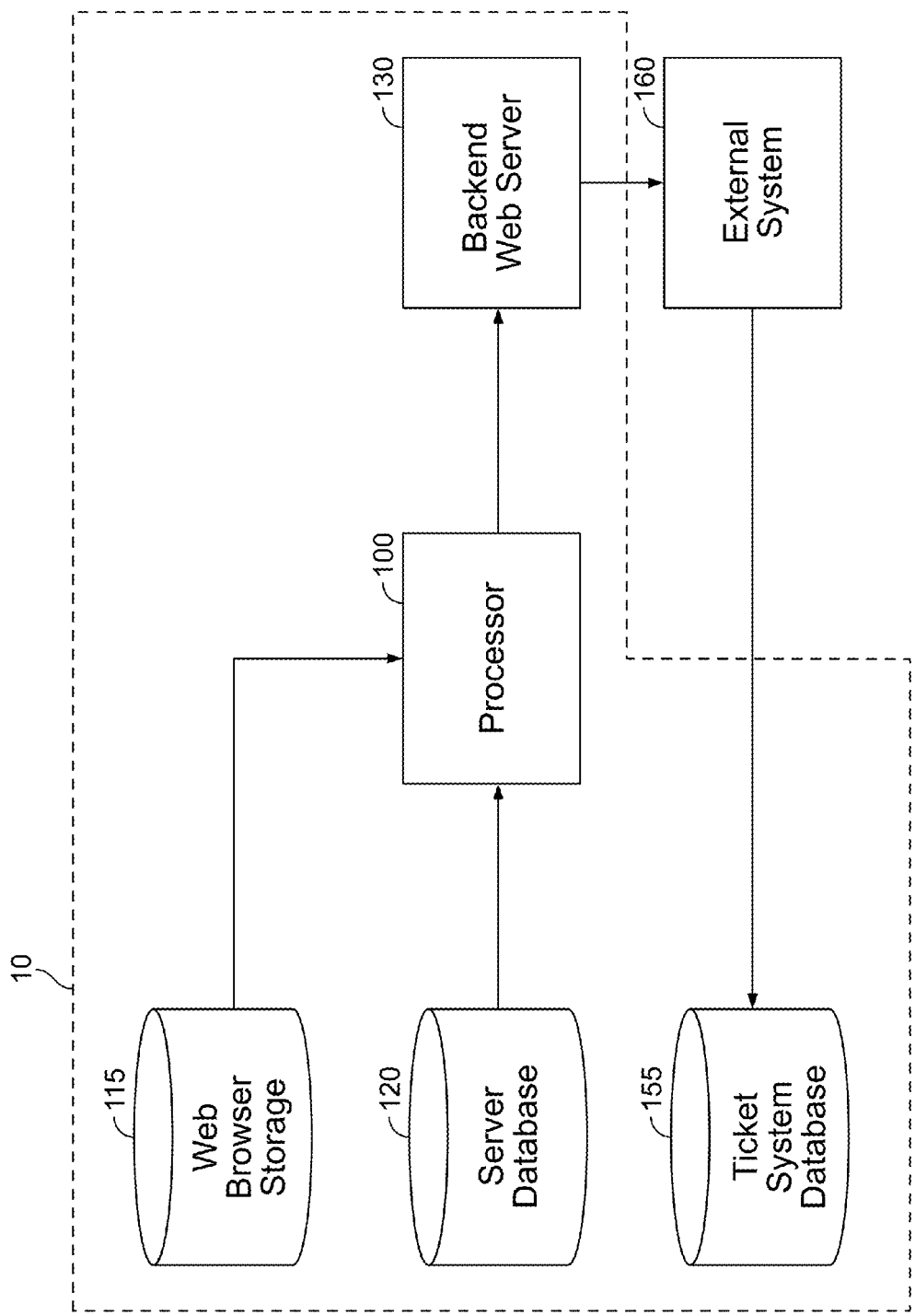
FIG. 1 is a block diagram of a system for automating the submission of issue reports, according to an embodiment of the present invention.

In the following detailed description, numerous specific details are set forth in order to provide a thorough understanding of embodiments of the invention. However, it will be understood by those of ordinary skill in the art that the embodiments of the present invention may be practiced without these specific details. In other instances, well-known methods, procedures, components, and circuits have not been described in detail so as not to obscure the present invention.

A system for automating reporting and submitting of issues may help customer service and engineers debug issues by providing essential tracking and log information from backend web servers. Accurate bug reports may be submitted that may contain auto-generated/in-browser screenshots of web software without the use of external, downloaded software, such as Java® apps, or operating system specific screen capturing functionality, such as Windows "Print Screen." The system may provide a cloud service that may utilize a JavaScript® (JS)/HTML5 issue submission form. As such, a browser or browser extension may capture client-side request information such as screenshots, URLs, and Trace-IDs. The system may be tightly integrated with the browser to facilitate such screenshots and to allow easy cross-origin submission of issues. A backend web server may accept the system-generated issue submissions to create issue tickets that may include relevant production logs.

The system may auto-track the last few steps of a software user to recreate an issue experienced by a user, may auto-snap associated screenshots, and may automatically provide server logs to provide useful information to customer care and engineers. HTML5, browser extension, and canvas technologies may be utilized to draw graphics via scripting, may automatically capture in-browser screenshots and unique hypertext transport protocol (HTTP) IDs, and may capture request information that provides customers with a simple interface for submitting an issue. Log information from servers may be aggregated.

Representational state transfer ("REST") abstraction of web architecture service may be utilized for issue submission. Cross-origin resource sharing headers may be used to facilitate cross-origin REST requests. Accordingly, the system may allow many resources associated with a web service to be requested from another domain outside the domain the resource from which it originated.

As such, when a user experiences an issue, the user is not required to manually utilize "Print Screen" functionality to capture screenshots associated with the issue, and does not need to manually compose an email describing the issue with associated files attached. The system for automating the submission of issue reports may always be active and, accordingly, a user will not face the predicament of not being able to recreate an experienced issue, as the last steps from which the issue resulted and associated log information may be automatically captured.

The system may utilize a backend web server to pre-screen the submitted issues, which in turn may enhance the readability of the logs associated with the issues. The system may automatically analyze the logs to distill the contents down to exactly what may be useful, and may generate an associated summary report.

In generating the issue reports, the information and images associated with an issue report may be stored in a data repository. The issue report itself may provide a link to this associated information and images, and as such, the system remains the source for aggregating and presenting the issues. Accordingly, the system may utilize hypermedia such that the system is not loaded with data that it does not need for processing.

In one embodiment, the system may identify and aggregate issue reports that are likely related to the same root cause. The comparison of log data and URLs associated with an issue report may be automated to determine if issue reports are related, which may speed up response time.

In another embodiment, the system may automatically encrypt screenshots and sensitive backend information, such as keys and passwords of the associated users. For example, the screenshots associated with a particular issue experienced by a user that are stored in the data repository may be automatically encrypted. As such, the images associated with a particular issue may not be attached to the system generated issue ticket that reports the issue. Instead a link may be provided in the generated issue ticket that links back to the data repository when the actual screenshots are stored.

In yet another embodiment, the system may utilize a backend web service to pre-screen issues that are submitted by a user, which may optimize the efficiency of reading the error logs. The system may partially analyze the logs such that the contents of the logs are distilled down to exactly what would be useful. In aggregating the server log information, the system may extract identifiable information to generate an issue report. The particular contents of the logs that are deemed useful may be configurable. The system may also automatically generate a summary report pertaining to the analyzed logs.

The system may automatically record screenshots and URLs of a web page accessed by a user associated with a response received by a user when an issue is experienced. The system may also generate and record a Trace-ID, which is a unique ID that is included as a header in every response to the browser, and which may also be included in every generated log message. The Trace-ID may be request specific across all independent servers. The system generated Trace-ID may also match the particular response that a user receives to every log message across the platform that was generated in delivering that response.

In one embodiment, when a user experiences an exception to the platform, this system generated Trace-ID may be displayed to the user via a user interface such that the user does not need to copy and paste the Trace-ID when reporting this issue. As such, the system may automatically capture the generated Trace-ID for all requests. The system may remain in an always-active state such that the last few requests of a user are tracked so that a user can immediately submit an issue report as soon as an issue is experienced.

The number of screenshots that are captured may be configurable. There may be one, two, three, dozens, or even hundreds. These screenshots may be stored in a browser's local storage, so the size of the local storage may limit the number of screenshots taken and stored. In addition, the more screenshots taken, the more information that could be uploaded as part of an issue report, which may affect the speed of the submission. The system may capture screenshots upon every page load and before every page unload to capture the difference between when the user received the page and what the user modified on the page prior to submitting the issue report. The system may compress and store the screenshots in an audit system archive. The system may utilize a visual difference tool to identify all changes made on a page in between submissions and subsequent audit trail logs.

Additionally, the system may bridge the gap between the server side and the client side, as production logs and the user's browser request history may be combined to generate a ticket. As such, the system may provide a complete audit trail paired with audit log records. When a user submits an issue report for an experienced exception to the platform utilized by the user, the system may automatically generate a ticket containing the issue report. The generated ticket may include the last URL visited by the user, a message provided by the user pertaining to the issue, the email address of the user, the Trace-ID associated with the requests, screenshots associated with each request and the date the screenshot was made.

The ticket may include a link to the debug messages that were recorded in the logs associated with a particular Trace-ID, which may include timestamps and other useful information. As such, these debug messages may provide essential tracking and log information from backend services. The user may also submit a brief narrative describing the issue. For example, the system may facilitate free text entry to the user prior to the user submitting the issue.

Reference is now made to FIG. 1, which is a block diagram of a system 10 for automating the submission of issue reports, according to an embodiment of the present invention. The system includes processor 100, backend web server 130, and three storage repositories: web browser storage 115, application server database 120, and ticket system database 155. Data associated with an issue or error experienced by a user that is stored on web browser storage 115 and application server database 120 may be received by processor 100. Data stored on web browser storage 115 may include user (request) information and images. Data stored on application server database 120 may include server log information associated with the issue experienced by the user.

Processor 100 may generate a unique identifier that matches a response received by the user when experiencing an issue to server log messages generated in response. Processor 100 may also aggregate server log information to associate the generated unique identifier with the user request information and images. Additionally, processor 100 may generate an issue report based on the user request information, images, server log information, and unique identifier. Backend web server 130 may receive the generated issue report and may generate a ticket associated with the issue report, and the ticket may be communicated to an external system 160. Issue data associated with the ticket may be stored on ticket system repository 155, which may be a database.

Figure 2:
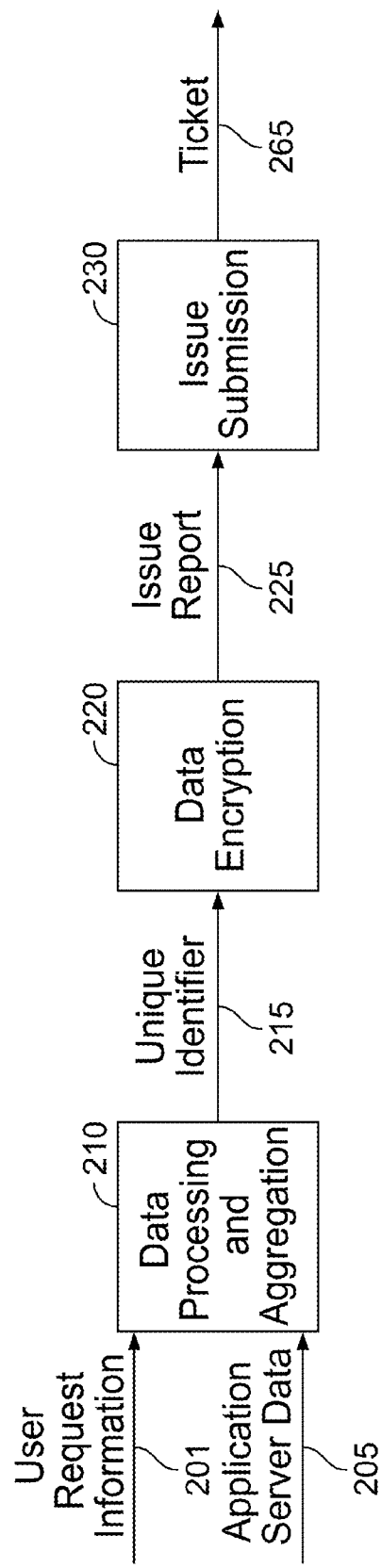
FIG. 2 is a flowchart illustrating the general operation of a system for automating the submission or issue reports, according to an embodiment of the present invention.

FIG. 2 is a flowchart illustrating the general operation of system 10, according to an embodiment of the invention. In operation 210, user request information 201 and application server data 205 may be processed and aggregated. Based on the data processing and aggregation, a unique identifier 215 may be generated that matches a response received by a user when experiencing an issue to server log messages generated in delivering that response. In operation 220, the user request information and images, application server data, and unique identifier may be encrypted, and such encrypted information may be used to generate issue report 225. In operation 230, a ticket 265 may be generated that is associated with the issue report to transmit ticket 265 to an external system, such as external system 160.

Figure 3A:
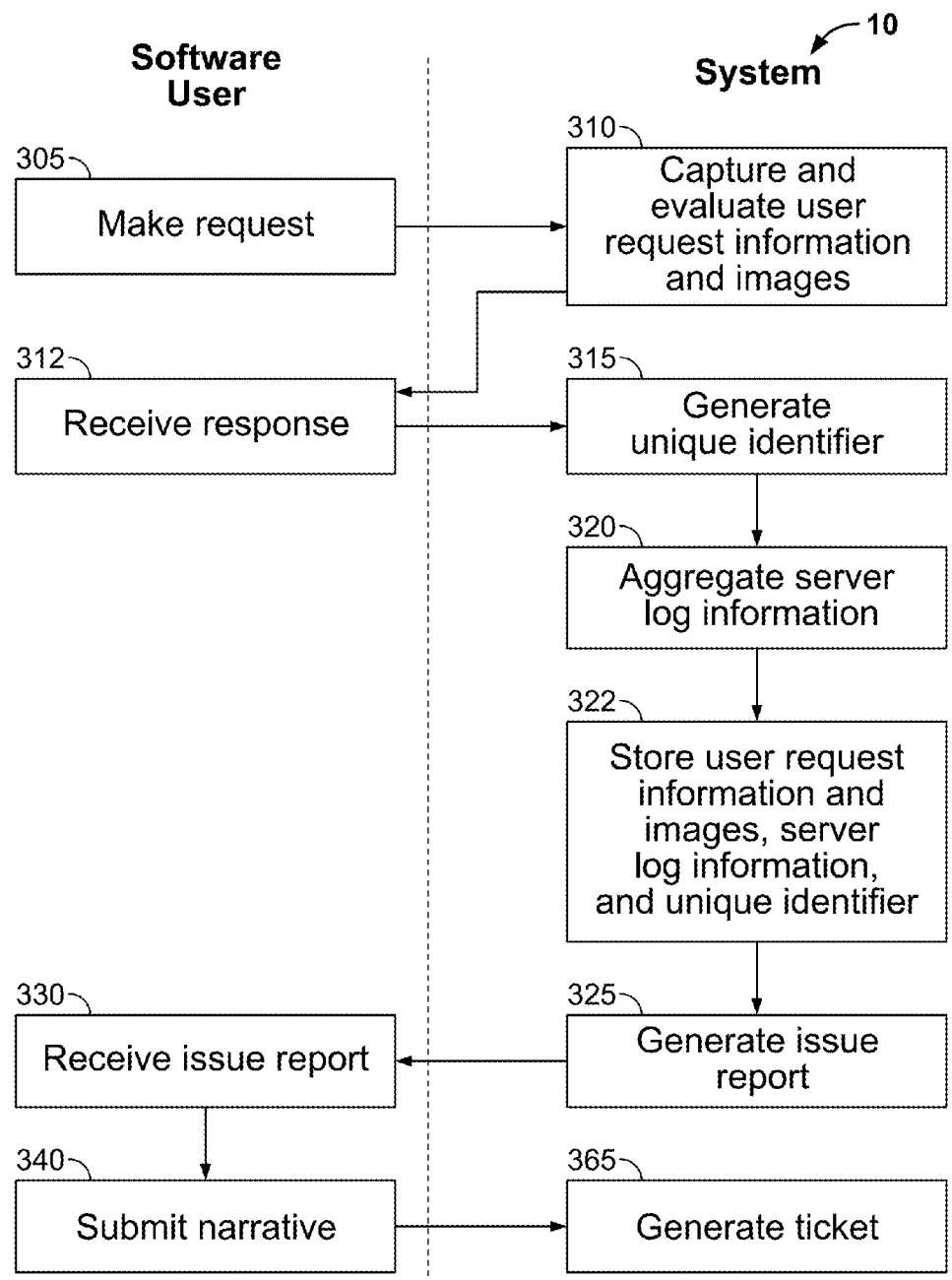
FIG. 3A is a flowchart illustrating the flow and processing of issue-related data, according to an embodiment of the present invention.

FIG. 3A is a flow diagram illustrating how a software user may utilize system 10 to automate the submission of an issue report. The software user may make a request (operation 305), which may include accessing a web page. Upon making a request, system 10 may automatically capture and evaluate the associated user request information and images (operation 310). This capture data may include the URLs of the web pages accessed by the user, the user metadata associated with the application request, as well as screenshots of the accessed pages. System 10 may store this data in local web browser repository 115.

The user may receive a response after making a request (operation 312). For example, if the user experiences an issue, the user may receive a response indicating that a particular exception has occurred. System 10 may generate a unique identifier (operation 315) associated with the response received by the user. System 10 may also aggregate server log information, for example using Sumo Logic™, to associate the generated unique identifier with the user request information and images (operation 320). The system may store the generated unique identifier, as well and the associated user request information and images, and server logs (operation 322).

System 10 may automatically generate an issue report (operation 325), which may include the associated unique identifier, screenshot, and user metadata. Upon receiving the system generated issue report (operation 330), a user may also submit a brief narrative describing the issue (operation 340). System 10 may utilize the issue report and the user-supplied narrative to generate a ticket pertaining to the submitted issue (operation 365). System 10 may send the generated ticket to an external system 160, such as a help desk system, a ticketing management system, a customer service system, or other software quality assurance (SQA) system, to be processed.

Figure 3B:
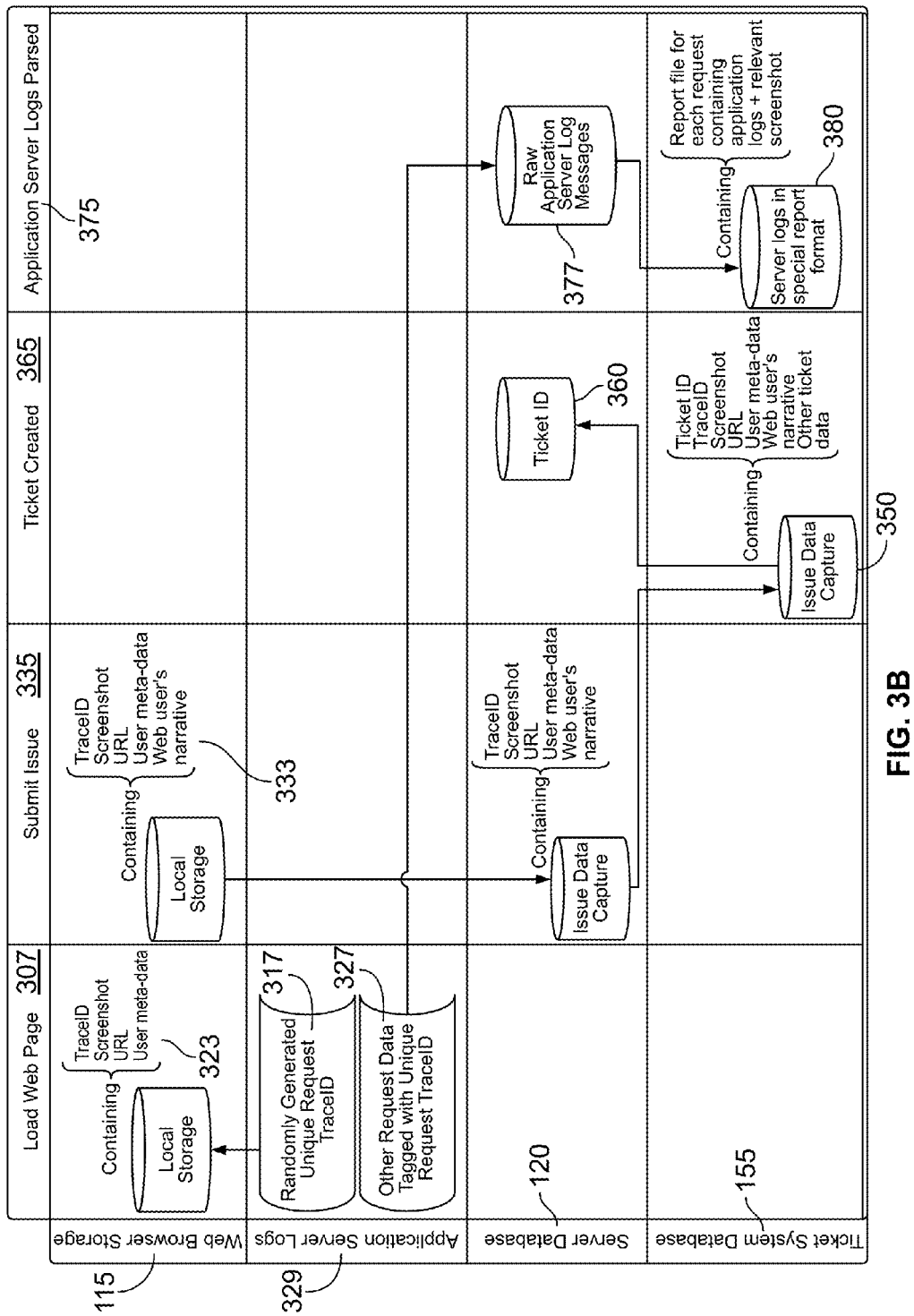
FIG. 3B is a flow diagram illustrating the data flow for the automated generation and submission of issue reports, according to an embodiment of the present invention.

Reference is now made to FIG. 3B, which is a flow diagram illustrating the data flow for the automated generation and submission of issue reports, according to an embodiment of the present invention. The top row indicates a sequential flow of time from left to right; the left hand column indicates the locations of data storage during the issue submission process, including web browser storage 115, application server logs 329, application server database 120, and associated ticket system database 155.

When a user accesses a particular webpage, system 10, upon every page load (operation 307) and before every page unload, may capture data 323 relating to the accessed webpage, which may include a screenshot of the accessed webpage and associated user request information, and this information may be stored in web browser (local) storage 115, which may be a data repository. The system may also automatically record URLs of a web page accessed by a user when experiencing an issue, as well as the user metadata associated with the application request made by the user.

Each request may be associated with a randomly generated unique request Trace-ID 317, which may be generated by the system using application server logs 329. This Trace-ID may be a unique identifier that matches a response received by a user for a request to server log messages or information generated in delivering the associated response, and may be stored on local web browser storage 115. System 10 may tag other requested data (327) with the system generated unique request Trace-ID.

The system may associate log data 307 stored on application server database 120 with data from the client side, which may include a screenshot, URL, and user metadata from what a user accesses while experiencing an issue. As such, the system may provide a complete audit trail based on information from the web browser storage paired with audit log records associated with a particular unique request Trace-ID.

The system may automatically parse and/or analyze the application server logs 329 (operation 375) including raw application server log messages 377 to distill the contents down to what may be useful, and accordingly may generate associated report file 380. The system may generate a report file 380 for each user request containing the associated application logs and relevant screenshots.

When a user submits an issue (operation 335), which may include the associated Trace-ID, screenshots, and user metadata, which may be stored on local web browser storage 115, the user may also submit a brief narrative describing the issue. The issue report data 333 may be transferred from web browser storage 115 to server database 120.

The system may automatically generate a ticket (operation 365) pertaining to the submitted issue. The generated ticket may be assigned a particular ticket ID 360, and may include the last URL visited by the user, a message provided by the user pertaining to the issue if provided by the user, the associated user metadata, the email address of the user, the Trace-ID associated with the requests, screenshots associated with each request, and the date the screenshot was made (operation 350). The issue data associated with the ticket may be stored on ticket system database 155.

Besides the operations shown in FIGS. 2, 3A, and 3B, other operations or series of operations are contemplated to automate the submission of issue reports. Subsidiary calculations or determinations may need to be made in order to carry out the operations shown in the flowcharts. Moreover, the actual orders of the operations in the flow diagrams are not indicated to be limiting, and the operations may be performed in any practical order.

Similarly, the parts and blocks shown in FIGS. 1 and 3B are examples of the parts that may comprise system 10, and do not limit the parts or modules that may be included in or connected to or associated with system 10. For example, although external system 160 is pictured as outside of system 10, it may be physically located near or with or be integrated with one or more parts of system 10.

FIG. 4A illustrates a web page 400 for an application that supports automating the submission of issue reports, according to an embodiment of the present invention. While the user is viewing the page, the system may automatically take a screenshot of the page. The number of screenshots that are captured may be configurable. The system may capture screenshots upon every page load and before every page unload to capture the difference between when the user received the page and what the user modified on the page prior to experiencing the issue. If the user experiences an issue, the user may initiate the submission of an issue report by utilizing a shortcut key or a button 410, which may be always available in one of the corners of the screen. In one embodiment, button 410 may be injected through JavaScript®.

FIG. 4B illustrates a user interface for submitting information related to an issue experienced by a user. Upon initiating the submission of an issue, for example by clicking button 410 on web page 400 in FIG. 4A, system interface 425 may appear as a pop-up window, allowing a user to provide an email address in box 430 and to manually input (free text) details into box 440 concerning the issue, such as steps to recreate the issue, other applications that were open when the issue was experienced, frequency of the issue, etc. The system may display in system interface 425 thumbnails 450 of the captured screenshots pertaining to the experienced issue. When the user submits the issue by clicking on button 460, the email address, the narrative, and the captured screenshots will be attached to the reported issue. Multiple captured screenshots may be associated with each reported issue.

FIG. 4C illustrates a user interface 465 displaying a system-generated ticket 490 associated with an issue report for an issue experienced by a user. A backend web server may receive an issue report and may utilize the issue report to generate a ticket that may be communicated to external system 160, such as a web-based help desk system, a ticketing management system, or a customer service system. The images associated with a particular issue may not be attached to the system-generated issue ticket which reports the issue; instead, a link may be provided in the generated issue ticket that links back to the data repository when the actual screenshots are stored.

System-generated ticket 490 may include useful information pertaining to the issue experienced by the user, which may include the last URL the user visited 470, a message manually entered by the user pertaining to the issue experienced 445, one or more Trace-IDs 480 associated with each request made by a user when experiencing the reported issue, and screenshots that accompany each of the requests, which may be displayed as thumbnails 455.

By automating the submission of issue reports, exceptions experienced in a customer's session may be combined with log information from all related backend systems to auto-generate issue submissions containing in-browser screenshots of software. As such, the system may bridge the gap between the client side—what a customer accesses, and the server side—production logs. Additionally a user will not be required to re-create an issue in order to report it, so the process of issue reporting will be simplified and standardized, while also improving the quality and speed of customer care.

Aspects of the present invention may be embodied in the form of a system, a computer program product, or a method. Similarly, aspects of the present invention may be embodied as hardware, software or a combination of both. The present invention may be an extension to a web browser, such as Google® Chrome™ or Internet Explorer® or may be incorporated in a browser. It may be integrated into a system used, for example, by help desk or SQA personnel.

Aspects of the present invention may be embodied as a computer program product saved on one or more computer-readable media in the form of computer-readable program code embodied thereon. For example, the computer-readable medium may be a computer-readable signal medium or a computer-readable storage medium. A computer-readable storage medium may be, for example, an electronic, optical, magnetic, electromagnetic, infrared, or semiconductor system, apparatus, or device, or any combination thereof.

Referring back to the block diagram for automating the submission of issue reports shown in FIG. 1, in an embodiment, processor 100 configured to automate the submission of issue reports may include a general-purpose computer and may have an internal or external memory for storing data and programs. The general-purpose computer may include a central processing unit (CPU) for executing instructions in response to commands and a communication device for sending and receiving data.

In one embodiment, the issue report and associated production logs may be transmitted over a network, which may include a communications interface that allows software and data to be transferred between client device, processor, the other system components, and the external systems. In this specification, the terms "computer program medium" and "computer-readable medium" are generally used to refer to media such as a removable storage device, a disk capable of installation in a disk drive, and signals on a channel. These computer program products may provide software or program instructions to a computer system. The automatic submission of issue reports application may be installed on a user's mobile device.

Computer programs that may be associated with applications of the system for automating the submission of issue reports (called "computer control logic") may be stored in the main memory or secondary memory. Such computer programs may also be received via a communications interface. Such computer programs, when executed, may enable the computer system to perform the features as discussed herein. In particular, the computer programs, when executed, may enable the processor to perform the described techniques. Accordingly, such computer programs may represent controllers of the computer system.

In one embodiment, the computer-based methods may be accessed or implemented over the World Wide Web by providing access via a web page to the methods described herein. Accordingly, the web page may be identified by a URL. The URL may denote both a server and a particular file or page on the server. In this embodiment, it is envisioned that a client computer system may interact with a browser to select a particular URL, which in turn may cause the browser to send a request for that URL or page to the server identified in the URL. Typically, the server may respond to the request by retrieving the requested page and transmitting the data for that page back to the requesting client computer system (the client/server interaction may be typically performed in accordance with HTTP). The selected page may then be displayed to the user on the client's display screen. The client may then cause the server containing a computer program to launch an application, for example, to perform an analysis according to the described techniques. In another implementation, the server may download an application to be run on the client to perform an analysis according to the described techniques.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. A computer-implemented method comprising:
automatically capturing information and images related to a user while using a software application before experiencing an issue;
receiving a request from the user involving the issue experienced by the user regarding using said software application;
evaluating the request and the user information and images;
generating a unique identifier that matches a response received by the user for the request to server log information generated in delivering the response;
aggregating server log information to automatically associate the unique identifier with the user information and images;
generating an issue report based on the user information and images, server log information, and unique identifier;
identifying and aggregating issue reports comprising related server log information; and
generating an issue ticket associated with the issue report.

2. The computer-implemented method of claim 1, further comprising automatically encrypting the user information and images and server log information.

3. The computer-implemented method of claim 1, further comprising storing the user information and images, server log information, and unique identifier in a data repository.

4. The computer-implemented method of claim 1, further comprising communicating the ticket to an external system.

5. The computer-implemented method of claim 4, wherein the external system is selected from a help desk system, a ticketing management system, and a customer service system.

6. The computer-implemented method of claim 1, wherein aggregating server log information comprises:
analyzing the server log information to extract identifiable information to generate the issue report; and
automatically generating a summary report of the identifiable information.

7. A system comprising:
a processor configured to:
automatically capture information and images related to a user while using a software application before experiencing an issue;
receive a request from the user involving the issue experienced by the user regarding using said software application;
evaluate the request and the user information and images;

generate a unique identifier that matches a response received by the user for the request to server log information generated in delivering the response;

aggregate server log information to automatically associate the unique identifier with the user information and images;

identify and aggregate issue reports comprising related server log information; and generate an issue report based on the user information and images, server log information, and unique identifier; and a backend web server configured to receive the issue report and generate an issue ticket associated with the issue report.

8. The system of claim 7, wherein the processor automatically encrypts the user information and images and server log information.

9. The system of claim 7, wherein the processor is configured to store the user information and images, server log information, and unique identifier in a data repository.

10. The system of claim 7, wherein the backend web server is configured to communicate the ticket to an external system.

11. The system of claim 10, wherein the external system is selected from a help desk system, a ticketing management system, and a customer service system.

12. The system of claim 7, wherein the processor is configured to:

analyze the server log information to extract identifiable information to generate the issue report; and automatically generate a summary report of the identifiable information.

13. A non-transitory computer-readable storage medium, comprising computer executable instructions therein, to be executed by a computer, for:

automatically capturing information and images related to a user while using a software application before experiencing an issue;

receiving a request from the user involving the issue experienced by the user regarding using said software application;

evaluating the request and the user information and images;

generating a unique identifier that matches a response received by the user for the request to server log information generated in delivering the response;

aggregating server log information to automatically associate the unique identifier with the user information and images;

generating an issue report based on the user information and images, server log information, and unique identifier;

identifying and aggregating issue reports comprising related server log information; and generating an issue ticket associated with the issue report.

14. The non-transitory computer-readable storage medium of claim 13, further comprising computer executable instructions embodied therein, to be executed by a computer, for automatically encrypting the user information and images and server log information.

15. The non-transitory computer-readable storage medium of claim 13, further comprising computer executable instructions embodied therein, to be executed by a computer, for automatically storing the user information and images, server log information, and unique identifier in a data repository.

16. The non-transitory computer-readable storage medium of claim 13, further comprising computer executable instructions embodied therein, to be executed by a computer, for communicating the ticket to an external system.

17. The non-transitory computer-readable storage medium of claim 16, wherein the external system is selected from a help desk system, a ticketing management system, and a customer service system.

18. The non-transitory computer-readable storage medium of claim 13, wherein aggregating server log information comprises:

analyzing the server log information to extract identifiable information to generate the issue report; and automatically generating a summary report of the identifiable information.

19. A computer-implemented method comprising:

auto-tracking a user's web browsing while browsing the Internet before experiencing an issue;

receiving a request from the user involving the issue experienced by the user regarding said Internet browsing;

capturing information and images from the user's web browsing;

evaluating the request and the user information and images;

generating a unique identifier that matches a response received by the user for the request to server log information generated in delivering the response;

aggregating server log information to automatically associate the unique identifier with the user information and images;

generating an issue report based on the user information and images, server log information, and unique identifier;

identifying and aggregating issue reports comprising related server log information; and generating an issue ticket associated with the issue report.

20. The computer-implemented method of claim 19, further comprising automatically encrypting the user information and images and server log information.

* * * * *

UNITED STATES PATENT AND TRADEMARK OFFICE
CERTIFICATE OF CORRECTION

PATENT NO. : 10,362,086 B2
APPLICATION NO. : 14/568769
DATED : July 23, 2019
INVENTOR(S) : Abbott It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 223 days.

Signed and Sealed this
Nineteenth Day of January, 2021

Andrei Iancu
*Director of the United States Patent and Trademark Office*